(12) United States Patent
Liao

(10) Patent No.: US 9,253,813 B2
(45) Date of Patent: Feb. 2, 2016

(54) MOBILE COMMUNICATION DEVICE AND COMMUNICATION MANAGEMENT METHOD THEREOF

(71) Applicant: HTC Corporation, Taoyuan, Taoyuan County (TW)

(72) Inventor: Chi-Yi Liao, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 98 days.

(21) Appl. No.: 14/280,193

(22) Filed: May 16, 2014

(65) Prior Publication Data

US 2015/0334761 A1   Nov. 19, 2015

(51) Int. Cl.
*H04M 1/00*   (2006.01)
*H04W 76/02*   (2009.01)
*H04W 88/06*   (2009.01)

(52) U.S. Cl.
CPC ............ *H04W 76/025* (2013.01); *H04W 88/06* (2013.01)

(58) Field of Classification Search
CPC ............................. H04W 76/025; H04W 88/06
See application file for complete search history.

(56) References Cited

U.S. PATENT DOCUMENTS

| 2006/0142052 | A1 | 6/2006 | Lai et al. | |
|---|---|---|---|---|
| 2013/0023275 | A1* | 1/2013 | Mutya | H04W 88/06 455/452.1 |
| 2013/0065557 | A1* | 3/2013 | Zhang | H04W 12/06 455/411 |

FOREIGN PATENT DOCUMENTS

| TW | I229538 | 3/2005 |
|---|---|---|
| TW | I286003 | 8/2007 |
| TW | 200910989 | 3/2009 |
| TW | 468846 | 12/2011 |

* cited by examiner

*Primary Examiner* — Chuong A Ngo
(74) *Attorney, Agent, or Firm* — Birch, Stewart, Kolasch & Birch, LLP

(57) ABSTRACT

A communication management method for a mobile communication device is provided and includes the steps of connecting first and second wireless communication units respectively to first and second service networks according to first and second information respectively provided by first and second Subscriber Identity Modules (SIMs); using first wireless communication unit to establish first call connection with remote communication device and afterward comparing qualities of first and second signals respectively received from first and second service networks; when quality of second signal is superior to quality of first signal, using second wireless communication unit to dial first SIM to establish second call connection with first wireless communication unit and afterward automatically establishing first multi-call connection among first and second wireless communication units and remote communication device; and then automatically establishing third call connection between second wireless communication unit and remote communication device in place of first call connection.

17 Claims, 6 Drawing Sheets

MOBILE COMMUNICATION DEVICE AND COMMUNICATION MANAGEMENT METHOD THEREOF

BACKGROUND OF THE INVENTION

1. Field of the Invention

The disclosure relates generally to mobile communication devices and communication management methods thereof and, more particularly to mobile communication devices with multiple Subscriber Identity Module cards and communication management methods thereof.

2. Description of the Related Art

Recently, portable devices such as handheld devices have become more and more technically advanced and multifunctional. For example, a handheld device may receive email messages, have an advanced contact management application, allow media playback, and have various other functions. Because of the conveniences of devices with multiple functions, the devices have become necessities of life.

As user habits change, more and more mobile devices now feature the option having two or more Subscriber Identity Module cards (SIM cards) on a single device in order to support multiple mobile numbers to be used at the same time. In such a mobile device with more than two SIM cards, each SIM card corresponds to a mobile number from a different service provider. Users may switch between mobile numbers depending on call location, signal strength, call cost, and other criteria.

However, when calling through a mobile device with multiple SIM cards, if signals become weaken during a call due to factors such as roaming into an area with weaker signals, the user may need to drop the call, switch to another mobile number, and dial again. This not only wastes call time, but also affects call quality and increases power consumption, thus causing the user inconvenience.

BRIEF SUMMARY OF THE INVENTION

Mobile communication devices and communication management methods thereof capable of performing network switching during calls are provided.

A mobile communication device in accordance with an exemplary embodiment of the invention comprises at least a first subscriber identity module (SIM), a second SIM, a first wireless communication unit, a second wireless communication unit and a processor. The first SIM stores at least first information and the second SIM stores at least second information. The first wireless communication unit is electrically coupled to the first SIM and is configured to connect to a first service network according to the first information and establish a first call connection with a remote communication device through the first service network. The second wireless communication unit is electrically coupled to the second SIM and is configured to connect to a second service network according to the second information. The processor is electrically coupled to the first wireless communication unit and the second wireless communication unit and is configured to compare quality of a first signal received by the first wireless communication unit from the first service network and quality of a second signal received by the second wireless communication unit from the second service network after the first call connection is established. When the quality of the second signal compared is superior to the quality of the first signal compared, the second wireless communication unit is configured to dial the first SIM to establish a second call connection with the first wireless communication unit through the second service network. After the second call connection is established, a first multi-call connection among the first and second wireless communication units and the remote communication device is automatically established. After the first multi-call connection is established, the first wireless communication unit automatically drops the first call connection and the second wireless communication unit automatically establishes a third call connection between the second wireless communication unit and the remote communication device in place of the first call connection.

According to an exemplary embodiment of the invention, a communication management method for a mobile communication device is provided, wherein the mobile communication device includes a first wireless communication unit, a second wireless communication unit, a first subscriber identity module (SIM), and a second SIM and the first wireless communication unit and the second wireless communication unit are electrically coupled to the first SIM and the second SIM, respectively. The communication management method comprises the following steps: connecting the first wireless communication unit to a first service network according to first information provided by the first SIM; connecting the second wireless communication unit to a second service network according to second information provided by the second SIM; using the first wireless communication unit to establish a first call connection with a remote communication device through the first service network; after establishing the first call connection, comparing quality of a first signal received by the first wireless communication unit from the first service network and quality of a second signal received by the second wireless communication unit from the second service network; when the quality of the second signal compared is superior to the quality of the first signal compared, using the second wireless communication unit to dial the first SIM to establish a second call connection with the first wireless communication unit through the second service network; after establishing the second call connection, automatically establishing a first multi-call connection among the first and second wireless communication units and the remote communication device; and after establishing the first multi-call connection, automatically dropping the first call connection and establishing a third call connection between the second wireless communication unit and the remote communication device in place of the first call connection.

A detailed description is given in the following embodiments with reference to the accompanying drawings.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
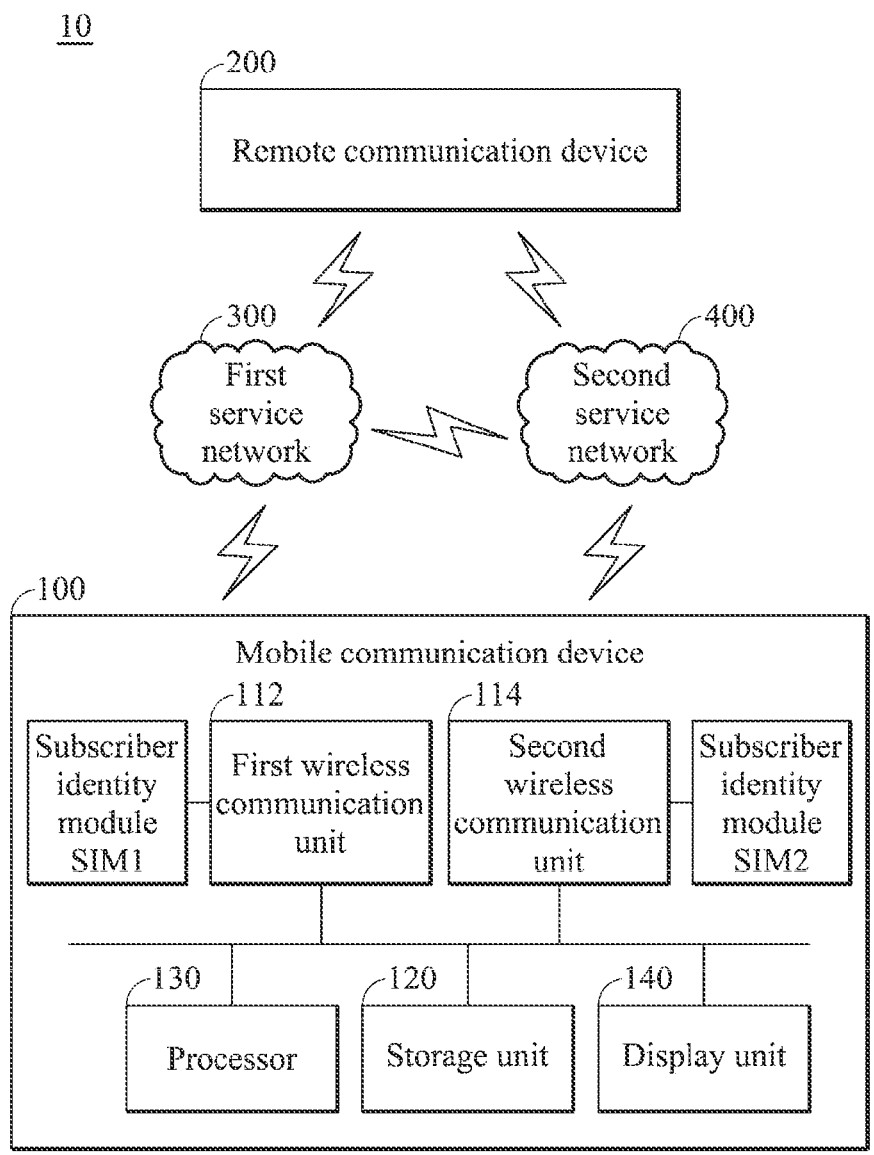
FIG. 1 is a schematic diagram illustrating an embodiment of a mobile communication system of the invention.

FIG. 1 is a schematic diagram illustrating an embodiment of a mobile communication system of the invention. As shown in FIG. 1, the mobile communication system 10 at least comprises a mobile communication device 100, a remote communication device 200 and a number of service networks 300-400, wherein the mobile communication device 100 can wirelessly connected to the first service network 300 and the second service network 400 and can wirelessly communicate with the remote communication device 200 through the first service network 300 and the second service network 400. The mobile communication device 100 may be any electronic device having calling features, such as a smartphone, mobile phone, tablet, or any other type of mobile Internet device. However, it is understood that the invention is not limited thereto. The remote communication device 200 may be used as a receiving communication device for a phone call or a transmitting communication device for a phone call. When the remote communication device 200 is used as a transmitting communication device, the remote communication device 200 can dial the mobile communication device 100 through the service network belonging to the remote communication device 200, e.g. the second service network 400, such that the mobile communication device 100 can receive an incoming call from the remote communication device 200 and communicate with the remote communication device 200 through the second service network 400. When the remote communication device 200 is used as a receiving communication device, the mobile communication device 100 can dial the remote communication device 200 through the service network belonging to the mobile communication device 100, e.g. the first service network 300, such that the remote communication device 200 can receive an incoming call from the mobile communication device 100 and communicate with the mobile communication device 100 through the first service network 300.

The mobile communication device 100 at least comprises a first wireless communication unit 112, a second wireless communication unit 114, a processor 130 and a number of SIMs SIM1-SIM2. The first wireless communication unit 112 and the second wireless communication unit 114 can separately perform wireless transmission and reception with the base stations or access points of the mobile communication service networks 300 and 400, such as 2G, 3G or 4G mobile communication service networks, and they can communicate with a receiving communication device or a transmitting communication device through the first service network 300 and the second service network 400.

To further clarify, each of the first wireless communication unit 112 and the second wireless communication unit 114 may comprise a baseband unit (not shown) and a radio frequency (RF) unit (not shown). The baseband unit may contain multiple hardware devices to perform baseband signal processing, including analog-to-digital conversion (ADC)/digital-to-analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system.

For example, in some embodiments, the first wireless communication unit 112 and the second wireless communication unit 114 may include one or more groups of physical baseband or radio frequency modules. In one embodiment, the first wireless communication unit 112 and the second wireless communication unit 114 may be integrated into a single wireless communication unit including a plurality of antennas, respectively corresponding to all the SIMs, wherein each SIM can send and receive wireless signals to and from the service network to which it belongs via a corresponding antenna. In another embodiment, the integrated single wireless communication unit may also include only a single antenna and all of the SIMs can send and receive wireless signals to and from the service network to which it belongs via that antenna in a Time Division Multiplexing (TDM) manner.

Each SIM is separately plugged into a socket of the mobile communication device 100. In some embodiments, the mobile communication device 100 may further comprise a multiple-card controller (not shown) coupled or connected between the baseband chip and the SIMs. The multiple-card controller powers the SIMs with the same or different voltage levels according to requirements thereof, wherein the voltage level for each SIM is determined during initiation. The baseband chip may read data from one of the SIMs, and write data to one of the SIMs via the multiple-card controller. For example, the first SIM1 and the second SIM SIM2 can be any type of subscriber identity cards, such as the SIM cards, Universal SIM (USIM) cards, and so on. A SIM card typically contains user account information, an international mobile subscriber identity (IMSI), and a set of SIM application toolkit (SAT) commands. A micro-processing unit (MCU) (not shown) of a baseband chip may interact with the MCU (not shown) of a SIM card to fetch data or SAT commands from the plugged-in SIM card. To further clarify, an IMSI being stored in the SIM card is a unique number to identify the mobile subscriber to identify effective messages of the mobile subscriber, which contains a Mobile Country Code (MCC) followed by a Mobile Network code (MNC), wherein the MCC indicates a country code belonging to the mobile subscriber and the MNC is a mobile network number to identify the mobile communication network belonging to the mobile subscriber. In other words, the IMSI can indicate an associated service network or network operator of the SIM card. In some embodiments, the multiple-card controller is integrated into the processor 130 and thus the processor 130 may read data from each of the SIMs and write data to each of the SIMs. The first SIM SIM1 may further store at least first information and the second SIM SIM2 may further store at least second information, wherein the first information includes at least one of an international mobile subscriber identity (IMSI), security authentication and ciphering information and temporary information related to the local network, and the second information includes at least one of an international mobile subscriber identity (IMSI), security authentication and ciphering information and temporary information related to the local network.

For example, in one embodiment, the first service network 300 may be a GSM/GPRS/EDGE system, and correspondingly, one of the SIMs may be a SIM card, while the second service network 400 may be a WCDMA, LTE, or TD-LTE system and correspondingly, the other one may be a Universal SIM (USIM) card.

In this embodiment, the first wireless communication unit 112 is electrically coupled to the first SIM SIM1 and can connect to the first service network 300 according to the first information and can dial the remote communication device 200 based on the first information to establish a first call connection with the remote communication device 200 through the first service network 300. Similarly, the second wireless communication unit 114 is electrically coupled to the second SIM SIM2 and can connect to the second service network 400 according to the second information and can dial the remote communication device 200 based on the second information to establish a call connection with the remote communication device 200 through the second service network 400.

Moreover, the processor 130 is electrically coupled to the first wireless communication unit 112 and the second wireless communication unit 114 for controlling the operation of the first wireless communication unit 112, the second wireless communication unit 114 and other functional components, such as the display unit 140 and/or keypad serving as the MMI (man-machine interface) and the storage unit 120 storing the program codes of applications or communication protocols, etc. In another embodiment, the processor 130 may be further integrated into the first wireless communication unit 112 or the second wireless communication unit 114. The storage unit 120 may be a built-in memory, or an external memory card, which stores related data, such as results for signal quality measurements. The display unit 140 can display related data, such as texts, figures, interfaces, and/or information. It is understood that, in some embodiments, the display unit 140 may be integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. To be more specific, the display unit 140 may further display a user interface for the user to select/assign a SIM from which to dial or to automatically switch to suitable SIM for dialing out using the communication management method of the invention.

It should be understood that, in the embodiments, at the time the first call connection is established, the processor 130 can obtain the measurement results for quality (e.g. signal strength and/or signal stability) of signals received from the service networks corresponding to the SIM modules through the first wireless communication unit 112, the second wireless communication unit 114 and the SIM modules and then compare quality of a first signal received by the first wireless communication unit 112 from the first service network 300 and quality of a second signal received by the second wireless communication unit 114 from the second service network 400. Particularly, signal quality can be measured and determined using a number of existing technologies, such as measuring the Received Signal Strength Indicator (RSSI) of signals received from the service network, the Received Signal Code Power (RSCP) of signals received from the service network, etc. Note that the higher the RSSI or RSCP value, the greater the signal strength of signals received from the service network, and thus the better signal quality. It should be understood that the aforementioned methods for signal quality measurement are only some embodiments and the invention is not limited thereto.

Figure 2:
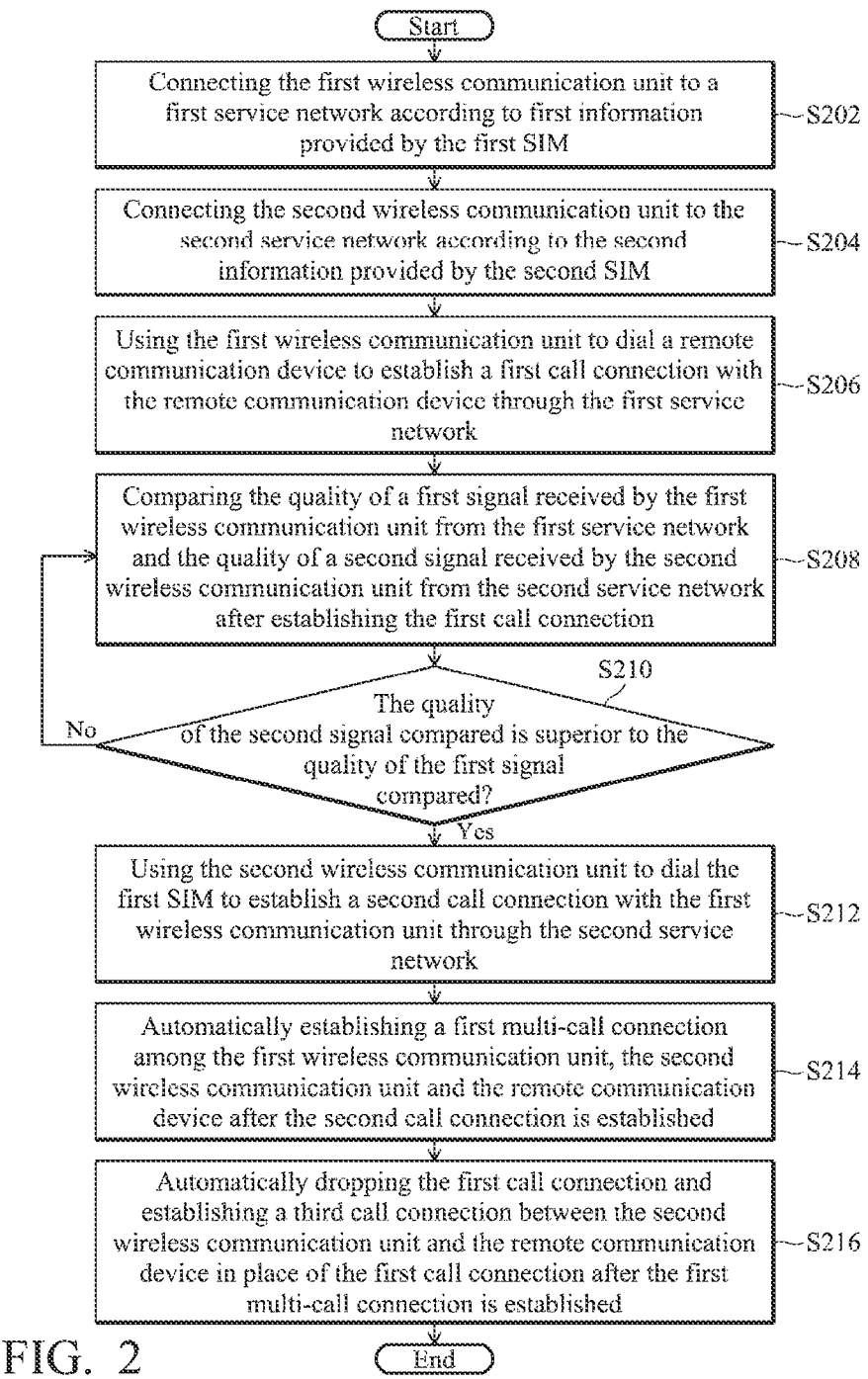
FIG. 2 is a flowchart of an embodiment of a communication management method of the invention.

FIG. 2 is a flowchart of an embodiment of a communication management method of the invention. The communication management method can be used for a mobile communication device. In this embodiment, it is assumed that the mobile communication device being used is the mobile communication device 100 shown in FIG. 1, which includes the first wireless communication unit 112, the second wireless communication unit 114, the first SIM SIM1 and the second SIM SIM2. The first wireless communication unit 112 is electrically coupled to the first SIM SIM1 and can connect to the first service network 300 according to the first information and can dial the remote communication device 200 based on the first information to establish a first call connection with the remote communication device 200 through the first service network 300. Similarly, the second wireless communication unit 114 is electrically coupled to the second SIM SIM2 and can connect to the second service network 400 according to the second information.

First, in step S202, the first wireless communication unit 112 connects to the first service network 300 according to the first information provided by the first SIM SIM1 and then in step S204, the second wireless communication unit 114 connects to the second service network 400 according to the second information provided by the second SIM SIM2. The first information may include at least one of an international mobile subscriber identity (IMSI), security authentication and ciphering information and temporary information related to the local network, and the second information may include at least one of an international mobile subscriber identity (IMSI), security authentication and ciphering information and temporary information related to the local network.

Next, in step S206, the first wireless communication unit 112 is used to dial the remote communication device 200 to establish a first call connection with the remote communication device 200 through the first service network 300.

After establishing the first call connection, the mobile communication device 100 may communicate with the remote communication device 200 through the established first call connection. Since the user of the mobile communication device 100 may roam into different areas during the call connection, the processor 130, in step S208, continues to measure and compare quality of a first signal received by the first wireless communication unit 112 from the first service network 300 and quality of a second signal received by the second wireless communication unit 114 from the second service network 400.

Then, in step S210, the processor 130 determines whether the quality of the second signal compared is superior to the quality of the first signal compared. As previously mentioned, signal quality can be measured and determined through a number of existing technologies, such as measuring the Received Signal Strength Indicator (RSSI) of signals received from the service network, the Received Signal Code Power (RSCP) of signals received from the service network, etc. Note that the higher the RSSI or RSCP value, the greater the signal strength of signals received from the service network, and thus the better signal quality. In some embodiments, the quality of the compared second signal is superior to the quality of the compared first signal means that a difference between the signal strength of the compared second signal and the signal strength of the compared first signal is greater than a predetermined threshold value. In some embodiments, the quality of the compared second signal is superior to the quality of the compared first signal means that the signal strength of the compared second signal is greater than the signal strength of the compared first signal.

When the quality of the compared first signal is superior to the quality of the compared second signal (No in step S210), no switching between the service networks is required, and the procedure reverts back to step S208, wherein the processor 130 continues to measure and compare the quality of the first signal received by the first wireless communication unit 112 from the first service network 300 and the quality of the second signal received by the second wireless communication unit 114 from the second service network 400.

When the quality of the compared second signal is superior to the quality of the compared first signal (Yes in step S210), switching between the service networks is required. Afterward, in step S212, the second wireless communication unit 114 is used to dial the first SIM SIM1 to establish a second call connection with the first wireless communication unit 112 through the second service network 400.

After the second call connection is established, the processor 130 automatically establishes, in step S214, a first multi-call connection among the first wireless communication unit 112, the second wireless communication unit 114 and the remote communication device 200. After the first multi-call connection is established, in step S216, the processor 130 automatically drops the first call connection between the first wireless communication unit 112 and the remote communication device 200 and establishes a third call connection between the second wireless communication unit 114 and the remote communication device 200 in place of the first call connection. Note that the multi-call function allows the user of the mobile communication device 100 to be able to communicate with users with two or more different phone numbers at the same time. The steps of automatically establishing the first multi-call connection and automatically dropping the first call connection and then establishing the third call connection are completed by the processor 130 automatically without requiring any inputs or commands from the user. It should be noted that, the goal for the third call connection in place of the first call connection is to use the third call connection to continue the original call of the first call connection between the mobile communication device 100 and the remote communication device 200.

For example, the mobile communication device 100 may include the first SIM SIM1 and the second SIM SIM2, and the phone number indicated by the first information of the first SIM SIM1 may be A and the phone number indicated by the second information of the second SIM SIM2 may be B. The mobile communication device 100 uses the first wireless communication unit 112 to dial the remote communication device 200 based on the first information (e.g. the phone number A) to establish a first call connection with the remote communication device 200 through the first service network 300. After the first call connection is established, the mobile communication device 100 may communicate with the remote communication device 200 through the established first call connection.

When the processor 130 determines that quality (e.g. signal strength and/or signal stability) of a second signal received by the second wireless communication unit 114 from the second service network 400 is superior to quality of a first signal received by the first wireless communication unit 112 from the first service network 300, the processor 130 uses the second wireless communication unit 114 to dial the first SIM SIM1 based on the second information (e.g. the phone number B), that is, to dial to the phone number A from the phone number B, so as to establish a second call connection with the first wireless communication unit 112 through the second service network 400. After the second call connection is established, the processor 130 automatically establishes a first multi-call connection among the first wireless communication unit 112, the second wireless communication unit 114 and the remote communication device 200. Meanwhile, the processor 130 can recognize that the phone number of the incoming call corresponds to the phone number of the SIM SIM2, and thus activate the multi-call function and automatically establish a first multi-call connection among the first wireless communication unit 112, the second wireless communication unit 114 and the remote communication device 200. Through the first multi-call connection, the remote communication device 200 can receive calls corresponding to both phone numbers A and B at the same time. After the first multi-call connection is established, the processor 130 automatically drops the first call connection between the first wireless communication unit 112 and the remote communication device 200 and establishes a third call connection between the second wireless communication unit 114 and the remote communication device 200 in place of the first call connection. In some embodiments, after the first multi-call connection is established, the second wireless communication unit 114 may further automatically drop the second call connection. By doing so, the call between the mobile communication device 100 and the remote communication device 200 can be seamlessly transferred to the second service network 400, which has the best signal quality, from the first service network 300, which has inferior signal quality, so as to continue the call without dropping.

In some embodiments, after the third call connection between the second wireless communication unit 114 and the remote communication device 200 is established, the processor 130 may continue to measure and compare quality of a third signal received from the first service network 300 and quality of a fourth signal received from the second service network 400. Additionally, when the quality of the third signal compared is superior to the quality of the fourth signal compared, processor 130 can use the first wireless communication unit 112 to dial the second SIM SIM2 based on the first information so as to establish a fourth call connection with the second wireless communication unit 114 through the first service network 300. After the fourth call connection is established, the processor 130 may automatically establish a second multi-call connection among the first wireless communication unit 112, the second wireless communication unit 114, and the remote communication device 200. After the second multi-call connection is established, the processor 130 can further automatically drop the third call connection between the second wireless communication unit 114 and the remote communication device 200 and establish a fifth call connection between the first wireless communication unit 112 and the remote communication device 200 in place of the third call connection. By doing so, the call between the mobile communication device 100 and the remote communication device 200 can be seamlessly transferred to the first service network 300, which has the best signal quality, from the second service network 400, which has inferior signal quality, so as to continue the call without dropping.

In some embodiments, the processor 130 can further set a threshold value to determine whether there is a need to switch from the service network corresponding to the SIM module currently in use to the service network corresponding to another SIM module to establish a call connection with the remote communication device 200, so as to prevent frequent switching between/among the service networks corresponding to different SIM modules for a call when the signals, which are received from the service networks corresponding to different SIM modules and measured and compared by the processor 130, are similar in quality. For example, it is assumed that the quality of signals received from the respective service networks can be divided into five levels, Level 1 representing the lowest signal strength with the poorest quality and Level 5 representing the greatest signal strength with the best quality. The threshold value can be set as a specific level (such as Level 2). The service network corresponding to the SIM module currently in use will switch a call to the service network corresponding to an unused SIM module with the best signal quality only when a difference between quality of a signal received from the service network corresponding to an unused SIM module and quality of a signal received from the service network corresponding to the SIM module currently in use is greater than Level 2 for example, the quality of the signal received from the service network corresponding to the SIM module currently in use is Level 1 while the quality of the signal received from the service network corresponding to an unused SIM module is Level 4), or when the quality of the signal received from the service network corresponding to an unused SIM module is superior to the quality of the signal received from the service network corresponding to the SIM module currently in use and also superior to Level 2 (for example, the quality of the signal received from the service network corresponding to the SIM module currently in use is Level 1 while the quality of the signal received from the service network corresponding to an unused SIM module is superior to or equal to Level 3). Accordingly, frequent switching between/among the service networks corresponding to different SIM modules for a call can be avoided. It is to be noted that the aforementioned unused SIM module refers to a SIM module not being used to establish a call connection while the quality of the signal received from the service network corresponding to an unused SIM module refers to the quality of the signal received from the service network connected through a wireless communication unit corresponding to the unused SIM module.

Figure 3:
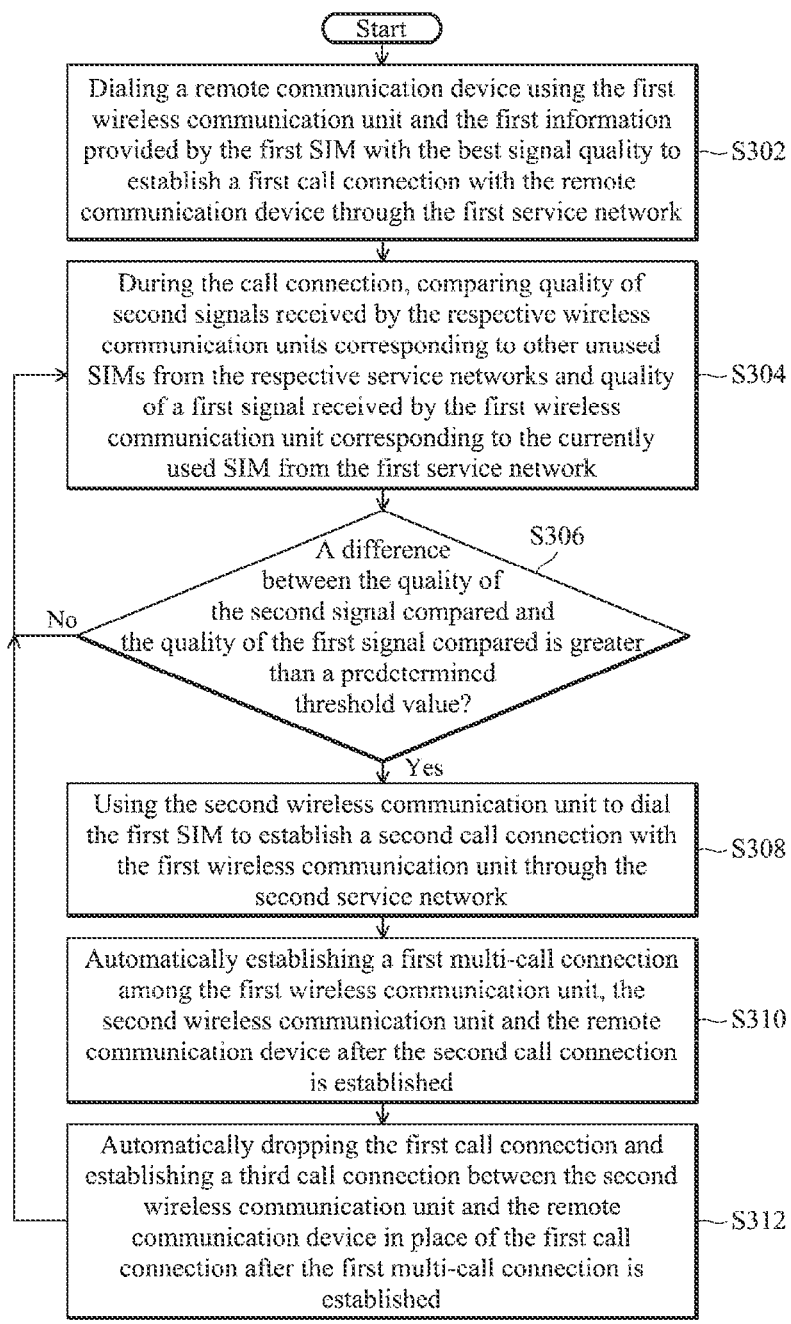
FIG. 3 is a flowchart of another embodiment of a communication management method of the invention.

FIG. 3 is a flowchart of another embodiment of a communication management method of the invention. The communication management method can be used for a mobile communication device. In this embodiment, the user may activate an option "call with the best signal quality" via a user interface. In this embodiment, it is assumed that the mobile communication device being used is the mobile communication device 100 shown in FIG. 1, which includes the first wireless communication unit 112, the second wireless communication unit 114, a third wireless communication unit (not shown), the first SIM SIM1, the second SIM SIM2 and a third SIM SIM3 (not shown). The first wireless communication unit 112 is electrically coupled to the first SIM SIM1 and can connect to the first service network 300 according to the first information and can dial the remote communication device 200 based on the first information to establish a first call connection with the remote communication device 200 through the first service network 300. Similarly, the second wireless communication unit 114 is electrically coupled to the second SIM SIM2 and can connect to the second service network 400 according to the second information, and the third wireless communication unit is electrically coupled to the third SIM SIM3 and can connect to the third service network (not shown) according to a third information. The third information may include at least one of an international mobile subscriber identity (IMSI), security authentication and ciphering information and temporary information related to the local network. It is to be noted that, in this embodiment, a SIM module with the best signal quality refers to the SIM module with the strongest signal quality among the quality of signals received from the connected service networks by the respective wireless communication units corresponding to all of the SIM modules.

First, the mobile communication device 100 dials the remote communication device 200 using the first information provided by the first SIM SIM1 with the best signal quality and the first wireless communication unit 112 corresponding thereto to establish a call connection with the remote communication device 200 through the first service network 300 (step S302). To be more specific, the mobile communication device 100 may use the first wireless communication unit 112 to dial the remote communication device 200 based on the first information (e.g. the phone number A) to establish a first call connection with the remote communication device 200 through the first service network 300. Meanwhile, other unused SIM modules within the mobile communication device 100 (e.g. the SIM SIM2 and the SIM SIM3) are in an unused state (e.g. the standby state). During the call connection, the mobile communication device 100 continues to measure and compare quality of second signals received by the respective wireless communication units corresponding to other unused SIM modules (e.g. the SIM SIM2 and the SIM SIM3) from the respective service networks and quality of a first signal received by the first wireless communication unit 112 corresponding to the currently used SIM from the first service network 300 according to a predetermined threshold value (step S304) and determines whether a difference between the quality of the second signal and the quality of the first signal is greater than a predetermined threshold value so as to determine whether a switch between the service networks is required (step S306). To be more specific, quality of signals received from the service networks corresponding to other unused SIM modules (e.g. the SIM SIM2 and the SIM SIM3) and quality of a signal received from the service network corresponding to the currently used SIM SIM1 refers to quality of signals received by the respective wireless communication units corresponding to all of other unused SIM modules from the respective service networks and quality of a signal received by the respective wireless communication unit corresponding to the currently used SIM SIM1 from the respective service network.

For example, in this embodiment, it is assumed that the quality of signals received from the respective service networks corresponding to all of the SIMs can be divided into five levels, Level 1 representing the lowest signal strength with the poorest quality and Level 5 representing the greatest signal strength with the best quality. The threshold value can be set as Level 2.

When the difference between the quality of signals received from the service networks corresponding to other unused SIM modules (e.g. the SIM SIM2 and the SIM SIM3) and the quality of the signal received from the service network corresponding to the SIM module currently in use is less than or equal to the threshold value (No in step S306), which means that the quality of signals received from the service networks are similar to each other and no switch between the service networks is required, step S304 will be repeated so that the mobile communication device 100 continues to measure the quality of second signals received from the respective service networks corresponding to other unused SIM modules and the quality of signal received from the service network corresponding to the currently used SIM according to the predetermined threshold value and then compare the difference therebetween.

When the difference between the quality of signals received from the service networks corresponding to other unused SIM modules (e.g. the SIM SIM2 and the SIM SIM3) and the quality of signal received from the service network corresponding to the SIM module currently in use is greater than the threshold value (Yes in step S306), which means that the difference between the quality of signals received from both service networks is large enough, the mobile communication device 100 uses the second wireless communication unit 114 to dial the first SIM SIM1, that is, to dial to the phone number A from the phone number B, so as to establish a second call connection with the first wireless communication unit 112 through the second service network 400 (step S308). After the second call connection is established, the mobile communication device 100 automatically establishes a first multi-call connection among the first wireless communication unit 112, the second wireless communication unit 114 and the remote communication device 200 (step S310). Meanwhile, the mobile communication device 100 can recognize that the phone number of incoming call corresponds to the phone number of the SIM SIM2 and thus activate the multi-call function and automatically establish a first multi-call connection among the first wireless communication unit 112, the second wireless communication unit 114 and the remote communication device 200. Through the first multi-call connection, the remote communication device 200 can receive calls corresponding to both the phone numbers A and B at the same time. After the first multi-call connection is established, the mobile communication device 100 can automatically drop the first call connection between the first wireless communication unit 112 and the remote communication device 200 and establishes a third call connection between the second wireless communication unit 114 and the remote communication device 200 in place of the first call connection (step S312).

Thereafter, the procedure reverts back to step S304 and the mobile communication device 100 continues to measure the quality of signals received from the respective service networks corresponding to other unused SIM modules and the quality of signal received from the service network corresponding to the currently used SIM according to the predetermined threshold value and determine whether to switch to another service network according thereto.

For example, it is assumed that the mobile communication device 100 includes the three SIMs SIM1, SIM2 and SIM3 and their respective phone numbers are A, B and C respectively. The mobile communication device 100 uses the first wireless communication unit 112 to dial the remote communication device 200 using the phone number A to establish a first call connection with the remote communication device 200 through the first service network 300. When the mobile communication device 100 determines that quality (e.g. signal strength and/or signal stability) of a second signal received by the second wireless communication unit 114 corresponding to the SIM SIM2 from the second service network 400 is superior to quality of a first signal received by the first wireless communication unit 112 from the first service network 300, the mobile communication device 100 uses the second wireless communication unit 114 to dial the first SIM SIM1 using the phone number B of the SIM SIM2, that is, to dial to the phone number A from the phone number B, so as to establish a second call connection with the first wireless communication unit 112 through the second service network 400. After the second call connection is established, the mobile communication device 100 may, such as through the processor 130, automatically establish a first multi-call connection among the first wireless communication unit 112, the second wireless communication unit 114 and the remote communication device 200. Meanwhile, the mobile communication device 100 can, such as through the processor 130, recognize that the phone number of incoming call corresponds to the phone number of the SIM SIM2 and thus activate the multi-call function and automatically establish a first multi-call connection among the first wireless communication unit 112, the second wireless communication unit 114 and the remote communication device 200. Through the first multi-call connection, the remote communication device 200 can receive calls corresponding to both the phone numbers A and B at the same time. After the first multi-call connection is established, the mobile communication device 100 automatically drops the first call connection between the first wireless communication unit 112 and the remote communication device 200 and establishes a third call connection between the second wireless communication unit 114 and the remote communication device 200 in place of the first call connection. Therefore, the call between the mobile communication device 100 and the remote communication device 200 can be seamlessly transferred to the second service network 400, which has the best signal quality, from the first service network 300, which has inferior signal quality, so as to continue the call without dropping.

Similarly, thereafter, when the mobile communication device 100 determines that quality of signal received by the third wireless communication unit corresponding to the SIM SIM3 from the third service network is superior to the quality of signal received by the first wireless communication unit 112 from the first service network 300 and the quality of signal received by the second wireless communication unit 114 from the second service network 400, the mobile communication device 100 uses the third wireless communication unit to dial the second SIM SIM2 using the phone number C of the SIM SIM3, that is, to dial to the phone number B from the phone number C, so as to establish a fourth call connection with the second wireless communication unit 114 through the third service network. After the fourth call connection is established, the mobile communication device 100 automatically establishes a second multi-call connection among the second wireless communication unit 114, the third wireless communication unit and the remote communication device 200. Meanwhile, the mobile communication device 100 can recognize that the phone number of incoming call corresponds to the phone number of the SIM SIM3 and thus activate the multi-call function and automatically establish the second multi-call connection among the second wireless communication unit 114, the third wireless communication unit and the remote communication device 200. Through the second multi-call connection, the remote communication device 200 can receive calls from both the phone numbers B and C at the same time. After the second multi-call connection is established, the mobile communication device 100 automatically drops the third call connection between the second wireless communication unit 114 and the remote communication device 200 and establishes a fifth call connection between the third wireless communication unit and the remote communication device 200 in place of the third call connection. Therefore, the call between the mobile communication device 100 and the remote communication device 200 can be seamlessly transferred to the third service network, which has the best signal quality, from the second service network 300, which has inferior signal quality, so as to continue the call without dropping.

Figure 4:
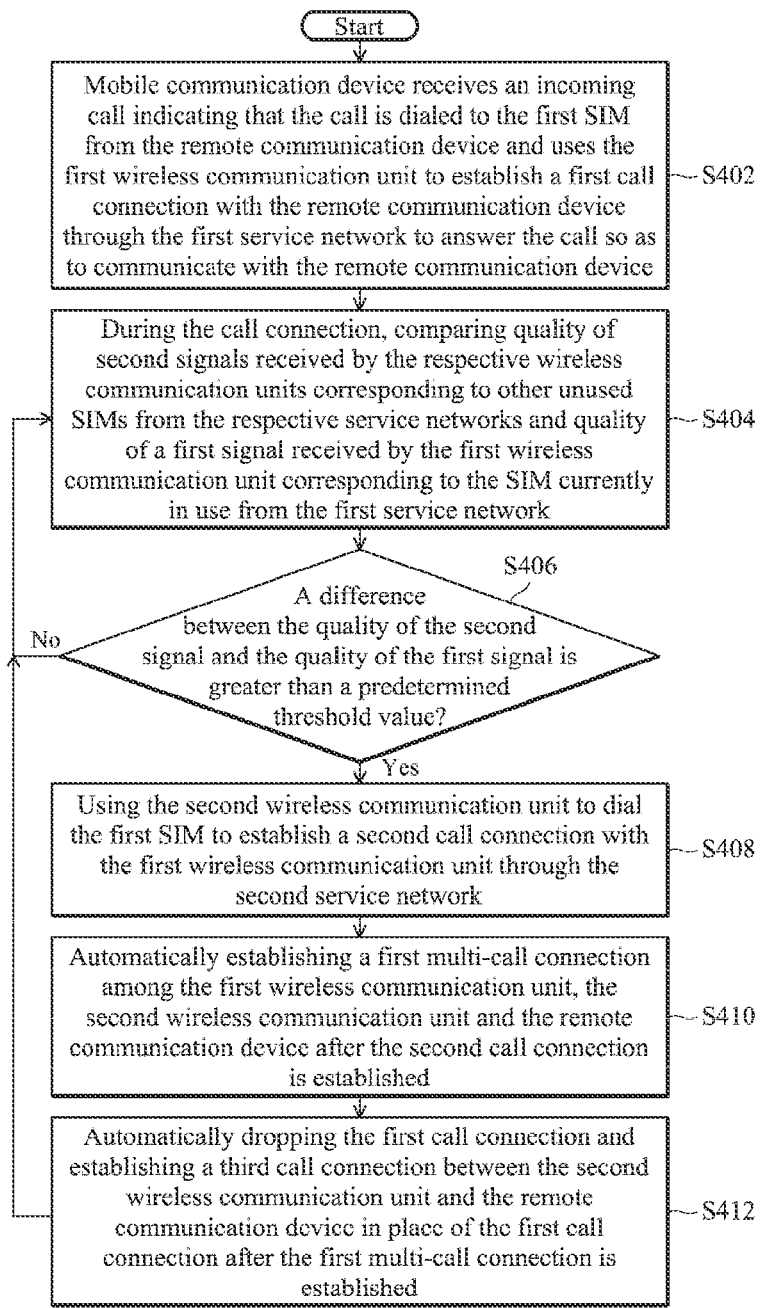
FIG. 4 is a flowchart of yet another embodiment of a communication management method of the invention.

FIG. 4 is a flowchart of yet another embodiment of a communication management method of the invention. In this embodiment, it is assumed that the mobile communication device include a plurality of SIM cards SIM1~SIM3 and the user may activate an option "call with the best signal quality" via a user interface.

In this embodiment, it is assumed that the mobile communication device being used is the mobile communication device 100 shown in FIG. 1, which includes the first wireless communication unit 112, the second wireless communication unit 114, a third wireless communication unit (not shown), the first SIM SIM1, the second SIM SIM2 and a third SIM SIM3 (not shown). The first wireless communication unit 112 is electrically coupled to the first SIM SIM1 and can connect to the first service network 300 according to the first information and can dial the remote communication device 200 based on the first information to establish a first call connection with the remote communication device 200 through the first service network 300. Similarly, the second wireless communication unit 114 is electrically coupled to the second SIM SIM2 and can connect to the second service network 400 according to the second information, and the third wireless communication unit is electrically coupled to the third SIM SIM3 and can connect to the third service network (not shown) according to a third information. The third information may include at least one of an international mobile subscriber identity (IMST), security authentication and ciphering information and temporary information related to the local network. It is to be noted that, in this embodiment, a SIM module with the best signal quality refers to the SIM module with the strongest signal quality among the quality of signals received from the connected service networks by the respective wireless communication units corresponding to all of the SIM modules.

First, the mobile communication device 100 receives an incoming call indicating that the call is dialed to the first SIM SIM1 from the remote communication device 200 and thus uses the first wireless communication unit 112 to establish a call connection with the remote communication device 200 through the first service network 300 to answer the call (step S402). Meanwhile, other unused SIM modules within the mobile communication device 100 (e.g. the SIM SIM2 and the SIM SIM3) are in an unused state (e.g. the standby state). During the call connection, the mobile communication device 100 continues to measure and compare quality of second signals received by the respective wireless communication units corresponding to other unused SIM modules (e.g. the SIM SIM2 and the SIM SIM3) from the respective service networks and quality of a first signal received by the first wireless communication unit 112 corresponding to the currently used SIM SIM 1 from the first service network 300 according to a predetermined threshold value (step S404) and determines whether a difference between the quality of the second signal and the quality of the first signal is greater than a predetermined threshold value so as to determine whether a switch between the service networks is required (step S406).

For example, in this embodiment, it is assumed that the quality of signals received from the respective service networks of all of the SIMs can be divided into five levels, Level 1 representing the lowest signal strength with the poorest quality and Level 5 representing the greatest signal strength with the best quality, the threshold value can be set as Level 2.

When the difference between the quality of signals received from the service networks corresponding to other unused SIM modules (e.g. the SIM SIM2 and SIM SIM3) and the quality of the signal received from the service network corresponding to the SIM module currently in use is less than or equal to the threshold value (No in step S406), which means that the quality of signals received from the service networks are similar to each other and no switch between the service networks is required, step S404 will be repeated so that the mobile communication device 100 continues to measure the quality of the second signals received from the respective service networks corresponding to other unused SIM modules and the quality of the signal received from the service network corresponding to the currently used SIM according to the predetermined threshold value and then compare the difference therebetween.

When the difference between the quality of signals received from the service networks corresponding to other unused SIM modules (e.g. the SIM SIM2) and the quality of the signal received from the service network corresponding to the SIM module currently in use is greater than the threshold value (Yes in step S406), which means that the difference between the quality of signals received from both service networks is large enough, the mobile communication device 100 uses the second wireless communication unit 114 to dial the first SIM SIM1, that is, to dial to the phone number A from the phone number B, so as to establish a second call connection with the first wireless communication unit 112 through the second service network 400 (step S408). After the second call connection is established, the mobile communication device 100 automatically establishes a first multi-call connection among the first wireless communication unit 112, the second wireless communication unit 114 and the remote communication device 200 (step S410). Meanwhile, the mobile communication device 100 can recognize that the phone number of incoming call corresponds to the phone number of the SIM SIM2 and thus activate the multi-call function and automatically establish a first multi-call connection among the first wireless communication unit 112, the second wireless communication unit 114 and the remote communication device 200. Through the first multi-call connection, the remote communication device 200 can receive calls corresponding to both the phone numbers A and B at the same time. After the first multi-call connection is established, the mobile communication device 100 can automatically drop the first call connection between the first wireless communication unit 112 and the remote communication device 200 and establish a third call connection between the second wireless communication unit 114 and the remote communication device 200 in place of the first call connection (step S412).

Thereafter, the procedure reverts back to step S404 and the mobile communication device 100 continues to measure the quality of second signals received from the respective service networks corresponding to other unused SIM modules and the quality of the signal received from the service network corresponding to the currently used SIM according to the predetermined threshold value and determine whether to switch to another service network according thereto.

It should be noted that, in the aforementioned embodiments, dropping of the first call connection between the first wireless communication unit 112 and the remote communication device 200 can be achieved by hanging up the first call connection or it can be achieved by maintaining the first call connection without hanging up by making the voice call during the first call connection between the first wireless communication unit 112 and the remote communication device 200 enter a mute mode. Similarly, dropping of the second call connection between the second wireless communication unit 114 and the remote communication device 200 can be achieved by hanging up the second call connection or it can be achieved by maintaining the second call connection without hanging up by making the voice call during the second call connection between the second wireless communication unit 114 and the remote communication device 200 enter a mute mode. Moreover, the first wireless communication unit 112 or the second wireless communication unit 114 can further enter into a power-saving mode to save power required except for maintaining the first call connection or the second call connection when the voice call on the first call connection or the second call connection has entered into the mute mode.

In some embodiments, the mobile communication device 100 may further provide a user interface that allows users to choose and determine whether to activate the switching mechanism with the best signal quality of the invention. FIG.

Figure 5:
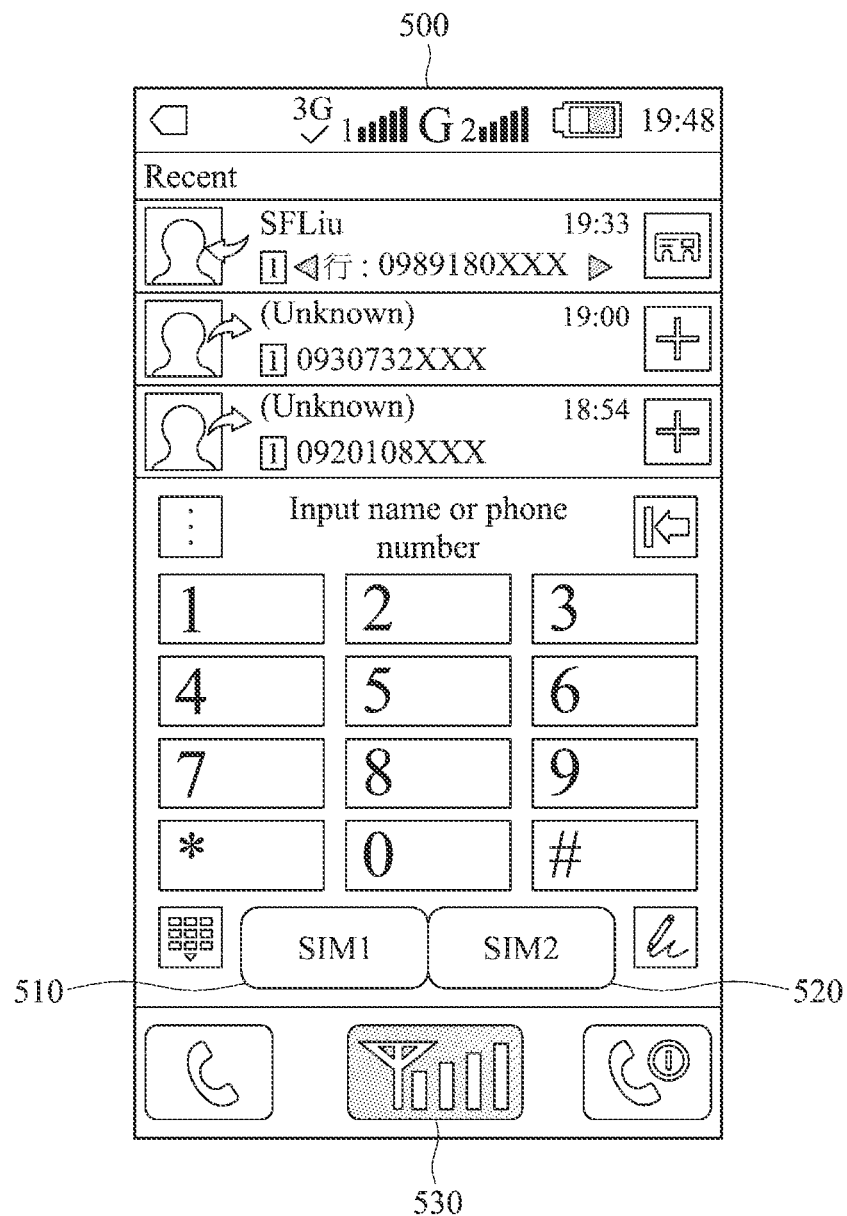
FIG. 5 is a schematic diagram illustrating an embodiment of a user interface of the invention.

5 is a schematic diagram illustrating an embodiment of a user interface of the invention. As shown in FIG. 5, the display unit 140 of the mobile communication device 100 can display the user interface 500 with the dialing feature. The user interface 500 provides a number of options, at least including a first option (SIM1) 510 provided for a user to select dialing from the first SIM SIM1 to the remote communication device 200, a second option (SIM2) 520 provided for the user to select dialing from the second SIM SIM2 to the remote communication device 200, and a third option 530 (a call option with the best signal quality) provided for the processor 130 to automatically select dialing from the first SIM SIM1 or the second SIM SIM2 to the remote communication device 200 based on the quality of the first signal received by the first wireless communication unit 112 and the quality of the second signal received by the second wireless communication unit 114. In particular, when making a phone call, users may select either the option 510 or the option 520 so as to manually designate the first SIM SIM1 or the second SIM SIM2 to dial to the remote communication device 200. Additionally, the users may also select the option 530 to activate the best signal quality switching mechanism of the invention. When the SIM option 510 or the SIM option 520 is being selected, the mobile communication device 100 can establish a call connection by dialing from the first wireless communication unit 112 corresponding to the SIM SIM1 or dialing from the SIM SIM2 corresponding to the second wireless communication unit 114, respectively. When the option 530 is selected, the mobile communication device 100 can perform the communication management method of the invention to automatically establish a call connection by dialing from the SIM card with the best signal quality at the time. Furthermore, during the duration of the call connection, the quality of signals received form the service networks of the wireless communication units corresponding to all SIM cards continues to be measured. Then, when the measured quality of the signal received from the network of the wireless communication unit corresponding to any unused SIM card is superior to the quality of the signal received from the network of a wireless communication unit corresponding to the SIM card currently in use, the mobile communication device can automatically switch to the service network corresponding to the SIM card with the best signal quality to continue a call with the remote communication device 200. Since the communication management method of the invention can automatically select the SIM card with the best signal quality during a call connection and switch to the service network corresponding to the SIM card with the best signal quality to continue the call with the remote communication device 200, the power consumption of the phone can be effectively reduced.

Figure 6:
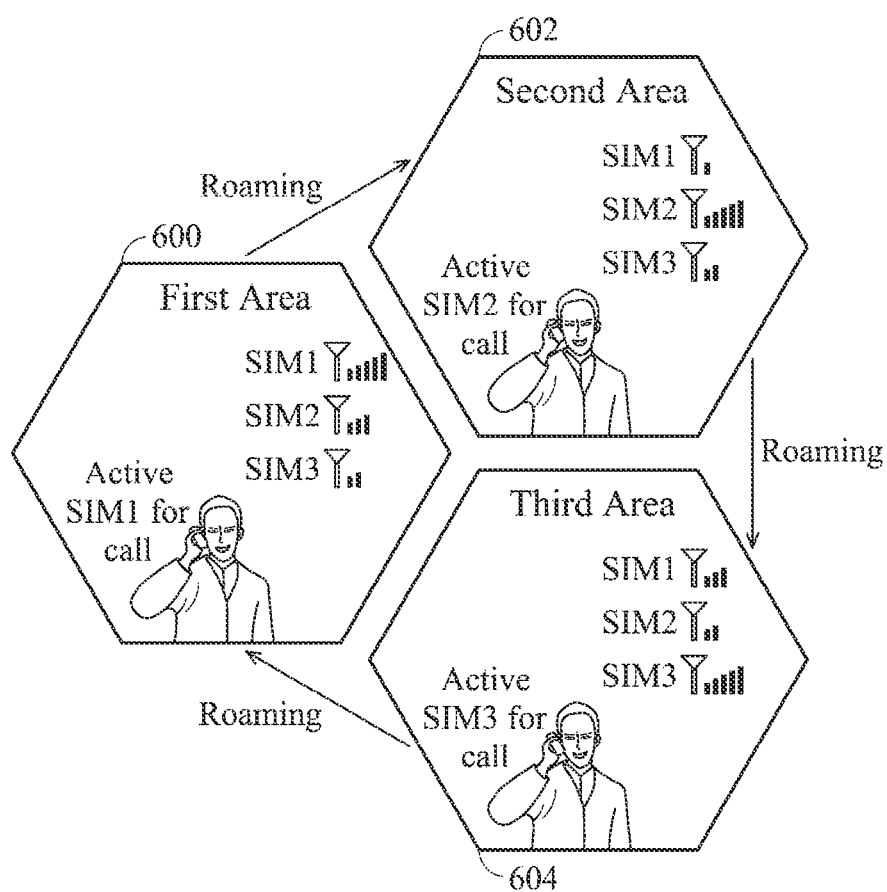
FIG. 6 is a schematic diagram illustrating an embodiment of operations of the communication management method of the invention.

For explanation, communication management methods are illustrated as examples in this embodiment, and those skilled in the art will understand that the present invention is not limited thereto. FIG. 6 is a schematic diagram illustrating an embodiment of operations of the communication management method of the invention. In this embodiment, it is assumed that a user utilizes a mobile communication device with three SIM cards SIM1-SIM3 to roam among three different areas 602, 604 and 606 and the user may select to perform the communication management method for call control via a user interface (e.g. the user interface 500 of FIG. 5). In the first area 600, the mobile communication device detects that the SIM card SIM1 is with the best signal quality among the qualities of signals received from the service networks corresponding to the SIM cards SIM1-SIM3 and thus the mobile communication device 100 uses the wireless communication unit corresponding to the SIM card SIM1 to dial a remote communication device to make a call. When the user roams into the second area 602, the mobile communication device detects that the SIM2 is with the best signal quality among the qualities of signals received from the service networks corresponding to the SIM cards SIM1-SIM3 and thus the mobile communication device 100 automatically and dynamically switches the call connection between the mobile communication device and the remote communication device from the service network corresponding to the SIM card SIM1 to the service network corresponding to the SIM card SIM2 using the aforementioned multi-call function and then communicates with the remote communication device through the service network corresponding to the SIM card SIM2 to continue the call without dropping. Similarly, when the user roams into the third area 603, the mobile communication device detects that the SIM card SIM3 is with the best signal quality among the qualities of signals received from the service networks corresponding to the SIM cards SIM1-SIM3 and thus the mobile communication device 100 automatically and dynamically switches the call connection between the mobile communication device and the remote communication device from the service network corresponding to the SIM card SIM2 to the service network corresponding to the SIM card SIM3 using the aforementioned multi-call function and then communicates with the remote communication device through the service network corresponding to the SIM card SIM3 to continue the call without dropping.

Therefore, the mobile communication devices and communication management methods thereof of the present invention can automatically detect the signal quality received from the service network of all SIM modules during a call connection and when the measured quality of the signal received from the network corresponding to any unused SIM module is superior to the quality of the signal received from the network corresponding to the SIM module currently in use, automatically dial from the wireless communication unit corresponding to the unused SIM module to the SIM module currently in use, such that the SIM module currently in use can initial the multi-call function and after the multi-call function is initiated, automatically drop the connection between the wireless communication unit corresponding to the SIM module currently in use and its corresponding service network, and automatically and dynamically seamlessly switch to the service network with the best signal quality for a current call without dropping it, thus effectively enhancing call quality, reducing power consumption, and further ensuring convenient use.

The described embodiments for communication management, or certain aspects or portions thereof, may be practiced in logic circuits, or may take the form of a program code (i.e., instructions) embodied in tangible media, such as floppy diskettes, CD-ROMS, hard drives, or any other machine-readable storage medium, wherein, when the program codes are loaded into and executed by a machine, such as a smart phone, a mobile phone, or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, the machine becomes an apparatus for practicing the invention. When implemented on a general-purpose processor, the program codes combine with the processor to provide a unique apparatus that operate analogously to specific logic circuits.

While the invention has been described by way of example and in terms of preferred embodiment, it is to be understood that the invention is not limited thereto. On the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A communication management method for a mobile communication device, wherein the mobile communication device includes a first wireless communication unit, a second wireless communication unit, a first subscriber identity module (SIM) and a second SIM and the first wireless communication unit and the second wireless communication unit are electrically coupled to the first subscriber identity module and the second subscriber identity module respectively, the method comprising:
  connecting the first wireless communication unit to a first service network according to first information provided by the first SIM;
  connecting the second wireless communication unit to a second service network according to second information provided by the second SIM;
  using the first wireless communication unit to establish a first call connection with a remote communication device through the first service network;
  after establishing the first call connection, comparing quality of a first signal received by the first wireless communication unit from the first service network and quality of a second signal received by the second wireless communication unit from the second service network;
  when the quality of the second signal compared is superior to the quality of the first signal compared, using the second wireless communication unit to dial the first SIM to establish a second call connection with the first wireless communication unit through the second service network;
  after establishing the second call connection, automatically establishing a first multi-call connection among the first and second wireless communication units and the remote communication device; and
  after establishing the first multi-call connection, automatically dropping the first call connection and establishing a third call connection between the second wireless communication unit and the remote communication device in place of the first call connection.

2. The communication management method of claim 1, wherein the quality of the first signal and the quality of the second signal comprise signal strength and/or signal stability.

3. The communication management method of claim 2, wherein the quality of the compared second signal is superior to the quality of the compared first signal means that a difference between the signal strength of the compared second signal and the signal strength of the compared first signal is greater than a predetermined threshold value.

4. The communication management method of claim 2, wherein the quality of the compared second signal is superior to the quality of the compared first signal means that the signal strength of the compared second signal is greater than the signal strength of the compared first signal.

5. The communication management method of claim 4, wherein the signal strength of the compared second signal is greater than a predetermined threshold value.

6. The communication management method of claim 1, further comprising:
  automatically dropping the second call connection after establishing the first multi-call connection.

7. The communication management method of claim 1, wherein the first information includes at least one of an international mobile subscriber identity (IMSI), security authentication and ciphering information and temporary information related to the local network, and the second information includes at least one of an international mobile subscriber identity (IMST), security authentication and ciphering information and temporary information related to the local network.

8. The communication management method of claim 1, further comprising:
  after establishing the third call connection, comparing quality of a third signal received from the first service network and quality of a fourth signal received from the second service network;
  when the quality of the third signal compared is superior to the quality of the fourth signal compared, using the first wireless communication unit to dial the second SIM to establish a fourth call connection with the second wireless communication unit through the first service network;
  after establishing the fourth call connection, automatically establishing a second multi-call connection among the first and second wireless communication units and the remote communication device; and
  after establishing the second multi-call connection, automatically dropping the third call connection and establishing a fifth call connection between the first wireless communication unit and the remote communication device in place of the third call connection.

9. A mobile communication device, comprising:
  a first subscriber identity module (SIM) and a second SIM, wherein the first SIM stores at least first information and the second SIM stores at least second information;
  a first wireless communication unit electrically coupled to the first SIM and configured to connect to a first service network according to the first information and establish a first call connection with a remote communication device through the first service network;
  a second wireless communication unit electrically coupled to the second SIM and configured to connect to a second service network according to the second information; and
  a processor electrically coupled to the first wireless communication unit and the second wireless communication unit and configured to compare quality of a first signal received by the first wireless communication unit from the first service network and quality of a second signal received by the second wireless communication unit from the second service network after the first call connection is established;
  wherein when the quality of the second signal compared is superior to the quality of the first signal compared, the second wireless communication unit is configured to dial the first SIM to establish a second call connection with the first wireless communication unit through the second service network;
  wherein after the second call connection is established, a first multi-call connection among the first and second wireless communication units and the remote communication device is automatically established; and
  wherein after the first multi-call connection is established, the first wireless communication unit automatically drops the first call connection and the second wireless communication unit automatically establishes a third call connection between the second wireless communication unit and the remote communication device in place of the first call connection.

10. The mobile communication device of claim 9, wherein the quality of the first signal and the quality of the second signal comprise signal strength and/or signal stability.

11. The mobile communication device of claim 10, wherein the quality of the compared second signal is superior to the quality of the compared first signal means that a difference between the signal strength of the compared second signal and the signal strength of the compared first signal is greater than a predetermined threshold value.

12. The mobile communication device of claim 10, wherein the quality of the compared second signal is superior to the quality of the compared first signal means that the signal strength of the compared second signal is greater than the strength of the compared first signal.

13. The mobile communication device of claim 12, wherein the signal strength of the compared second signal is greater than a predetermined threshold value.

14. The mobile communication device of claim 9, wherein the second wireless communication unit further automatically drops the second call connection after the first multi-call connection is established.

15. The mobile communication device of claim 9, wherein the first information includes at least one of an international mobile subscriber identity (IMSI), security authentication and ciphering information and temporary information related to the local network, and the second information includes at least one of an international mobile subscriber identity (IMSI), security authentication and ciphering information and temporary information related to the local network.

16. The mobile communication device of claim 9, wherein after the third call connection is established, the processor further compares quality of a third signal received from the first service network and quality of a fourth signal received from the second service network; when the quality of the third signal compared is superior to the quality of the fourth signal compared, the first wireless communication unit is further configured to dial the second SIM to establish a fourth call connection with the second wireless communication unit through the first service network; after the fourth call connection is established, a second multi-call connection among the first and second wireless communication units and the remote communication device is automatically established; and after the second multi-call connection is established, the second wireless communication unit automatically drops the third call connection and the first wireless communication unit establishes a fifth call connection between the first wireless communication unit and the remote communication device in place of the third call connection.

17. The mobile communication device of claim 9, further comprising a user interface having a first option for a user to select dialing through the first SIM to the remote communication device, a second option for the user to select dialing through the second SIM to the remote communications device and a third option for enabling the processor to automatically select dialing through the first SIM or the second SIM to the remote communication device according to the quality of the first signal and the quality of the second signal.

* * * * *